United States Patent
Kanayama

(10) Patent No.: US 6,753,918 B1
(45) Date of Patent: Jun. 22, 2004

(54) LENS CONTROL UNIT AND LENS FOR TV CAMERA

(75) Inventor: Atsushi Kanayama, Omiya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/275,189

(22) Filed: Mar. 23, 1999

(30) Foreign Application Priority Data

Mar. 23, 1998 (JP) .......................................... 10-074019

(51) Int. Cl.⁷ .......................................... H04N 5/225
(52) U.S. Cl. .................................... 348/335
(58) Field of Search ................................ 348/335, 357, 348/211.14; 396/79, 529; 359/676, 693, 696, 698, 705

(56) References Cited

U.S. PATENT DOCUMENTS

| | | | |
|---|---|---|---|
| 5,122,825 A | * 6/1992 | Tokumaru et al. | 348/335 |
| 5,325,149 A | * 6/1994 | Kawahara | 348/335 |
| 5,434,621 A | * 7/1995 | Yu | 348/357 |
| 5,731,920 A | * 3/1998 | Katsuragawa | 396/529 |
| 5,739,854 A | * 4/1998 | Nishikawa | 348/335 |
| 6,035,137 A | 3/2000 | Kaneko et al. | |

FOREIGN PATENT DOCUMENTS

| JP | 7274053 A | 10/1995 |
|---|---|---|
| JP | 9304680 A | 11/1997 |

* cited by examiner

Primary Examiner—Wendy R. Garber
Assistant Examiner—Rashawn N. Tillery
(74) Attorney, Agent, or Firm—Birch, Stewart, Kolasch & Birch, LLP

(57) ABSTRACT

The lens control unit determines the operated amount of a control knob with a CPU through a rotary encoder and a counter, and outputs control signals corresponding to the operated amount through a D/A converter and a communication IC. In the initial state, the lens control unit is set in an analog mode, and outputs the control signal in the analog form. If a lens device controlled by the lens control unit has a serial communication function, the lens device transmits a pulse signal or a mode switch signal with an unexpected frequency for an analog signal to the lens control unit by superimposing the pulse signal on an answer signal. The lens control unit counts pulses included in the pulse signal with a counter to detect the mode switch signal. If the counted value of the counter reaches a predetermined value, the lens control unit shift to a digital mode and thereafter outputs the control signal in the digital form.

23 Claims, 4 Drawing Sheets

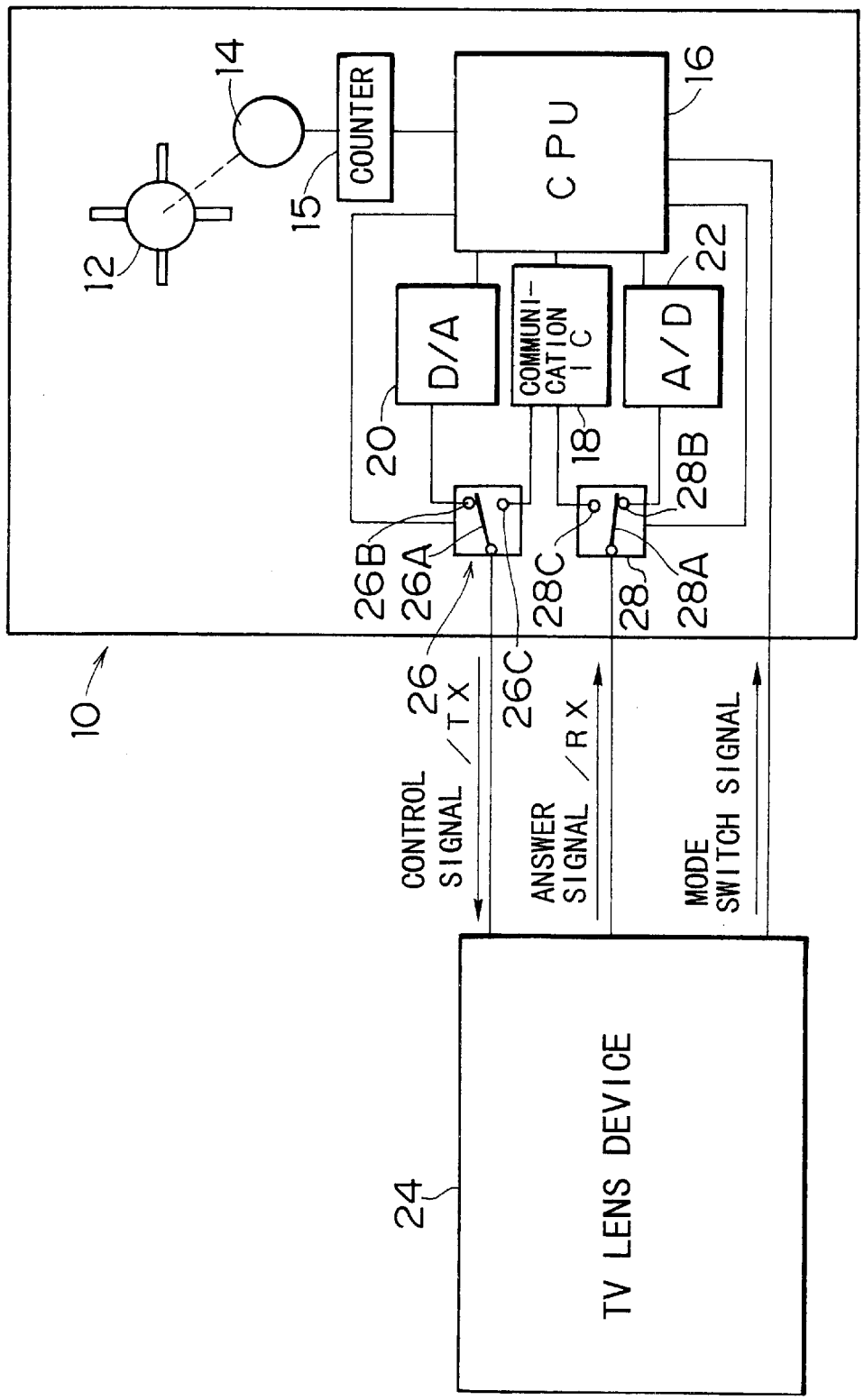
F I G. 1

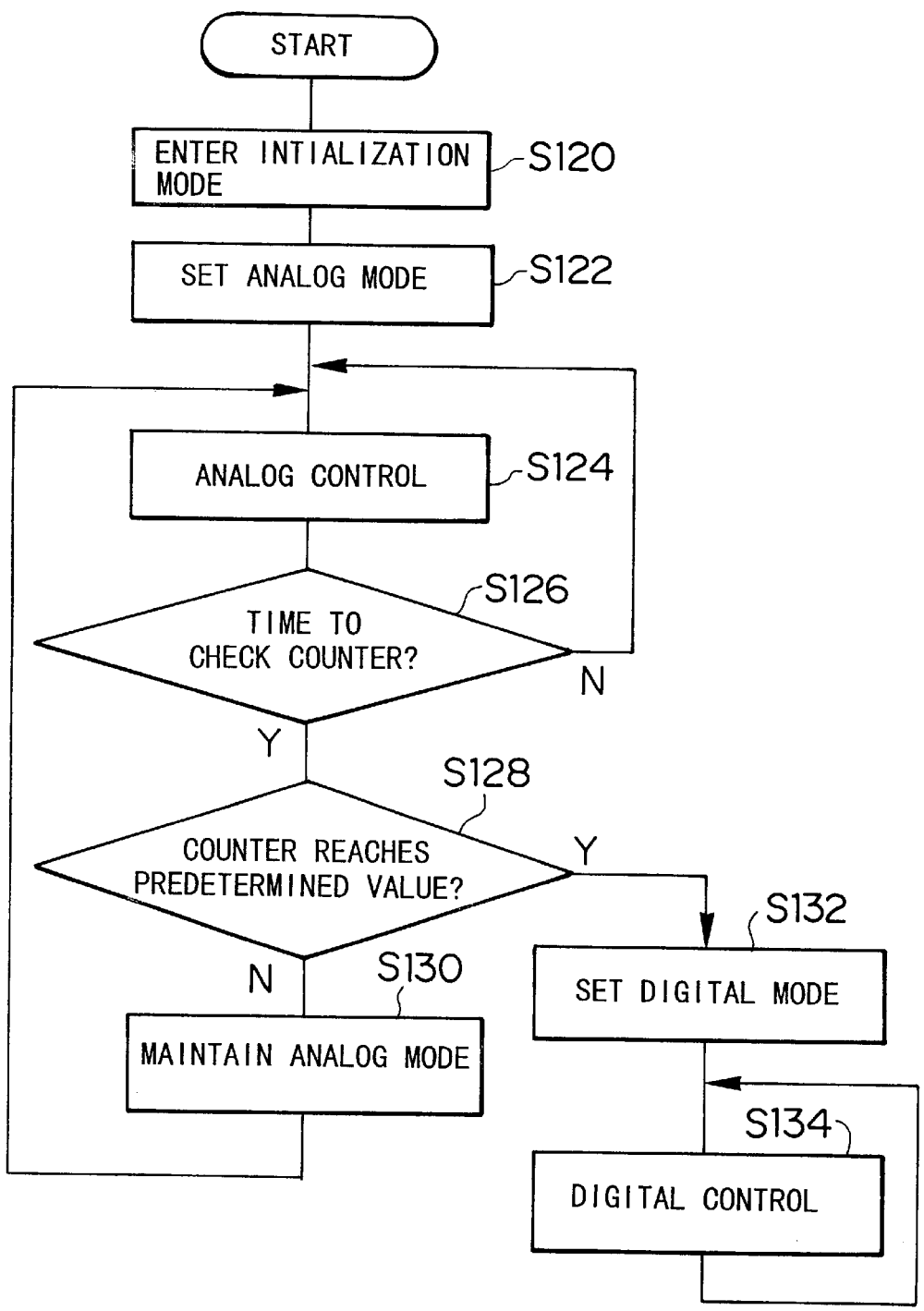

LENS CONTROL UNIT AND LENS FOR TV CAMERA

BACKGROUND OF THE INVENTION

1. Field of the Invention

This invention relates generally to a lens control unit and a lens device for a TV camera, and more particularly to a lens control unit that electrically controls the focus, zoom, etc. of a lens device used for a TV camera, and the lens device.

2. Description of Related Art

Japanese Patent Provisional Publication Nos. 7-274053 and 9-304680 disclose a conventional TV camera, in which a lens device connects to a control unit, which is operated by a cameraman to control the zoom and focus of the lens device, through a multiple-conductor cable, and the control unit controls the zoom and focus with analog voltage signals. The control unit has recently been provided with a variety of ON/OFF switches and many functions such as controlling an extender in addition to the function of controlling the zoom and focus. At present, the cable connecting the control unit and the lens device merely includes about ten to thirty conductors, and hence, it is difficult to add new functions to the control unit.

To solve the above-mentioned problem, it may be considered to perform serial communication for connecting the control unit and the lens device to thereby transmit a variety of signals in a digital mode through a cable with a small number of conductors. However, the lens device and the control unit are detachably connected through connectors, and the lens device and the control unit are not always used in the same combination. A control unit in the digital mode cannot be connected to a lens device that cannot be operated with digital signals. This causes a problem when the components are replaced in emergency.

SUMMARY OF THE INVENTION

In view of the foregoing, it is therefore an object of the invention to provide a lens control unit for a TV camera, which is able to output control signals in both analog and digital modes, switch the modes according to a control mode of the lens device, or output the control signals in both analog and digital modes at the same time, and a lens device controlled by the lens control unit.

To achieve the above-mentioned object, the present invention is directed to a lens control unit electrically connecting to a lens device of a TV camera to control at least one of zoom, focus, iris and macro of the lens device, the lens control unit comprising: a first control signal generator for generating an analog control signal; and a second control signal generator for generating a digital control signal; wherein the lens control unit outputs both the analog control signal and the digital control signal to control the lens device.

The lens control unit of the present invention operates in both the analog mode and the digital mode, and outputs the control signals in both modes to the lens device simultaneously or selectively. Then, the lens device receiving the control signals selects either one mode. Thus, one control unit can control both the lens device in the analog mode and the lens device in the digital mode.

Hence, the lens devices and the control units can be combined more freely than before, and the components can easily be replaced in emergency. To achieve the above-mentioned object, the present invention is directed to a lens control unit electrically connecting to a lens device of a TV camera to control at least one of zoom, focus, iris and macro of the lens device, the lens control unit comprising: a first control signal generator for generating an analog control signal; a second control signal generator for generating a digital control signal; a detector for detecting a mode switch signal outputted from the lens device; and a mode selector for selecting a mode of the lens control unit from an analog mode and a digital mode in accordance with the mode switch signal detected by the detector; wherein the lens control unit outputs one of the analog control signal and the digital control signal in the mode selected by the mode selector to control the lens device.

The lens control unit of the present invention operates in both the analog mode and the digital mode, and detects the mode switch signal transmitted from the lens device by the detector to select the mode of the control signal from the analog and digital modes in accordance with the lens device. Thus, one control unit can control both the lens device in the analog mode and the lens device in the digital mode.

If the lens control unit receives the mode switch signal from the lens device to select the mode of the control signal as stated above, it is necessary to provide a signal line for transmitting the mode switch signal. Usually, however, there is no extra line in a multiple-conductor cable connecting the control unit and the lens device, and it is therefore impossible to provide a special line for transmitting the mode switch signal.

The lens control unit further comprising: an answer signal line for transmitting an answer signal outputted from the lens device, the answer signal representing at least one of states of the zoom, the focus, the iris and the macro of the lens device; wherein the mode switch signal has a frequency different from the answer signal, and the detector detects the mode switch signal through the answer signal line without a special line for the mode switch signal. Thus, the signal with the unexpected frequency for the normal answer signal is used as the mode switch signal and is superimposed on the line of the answer signal. The mode switch signal can be detected separately from the normal answer signal.

In the above-mentioned case, a lens device controlled by the lens control unit comprises: a mode switch signal generator for generating the mode switch signal selecting the mode of the lens control unit; wherein the lens device outputs an answer signal representing at least one of states of the zoom, the focus, the iris and the macro of the lens device, and the mode switch signal has a frequency different from the answer signal.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 1 is a block diagram showing a lens control unit for a TV camera, which is constructed in accordance with the first embodiment of this invention;

FIG. 4 is a flow chart showing the procedure for selecting the analog mode or the digital mode in the lens control unit in FIG. 3.

DETAILED DESCRIPTION OF THE PREFERRED EMBODIMENT

Figure 2:
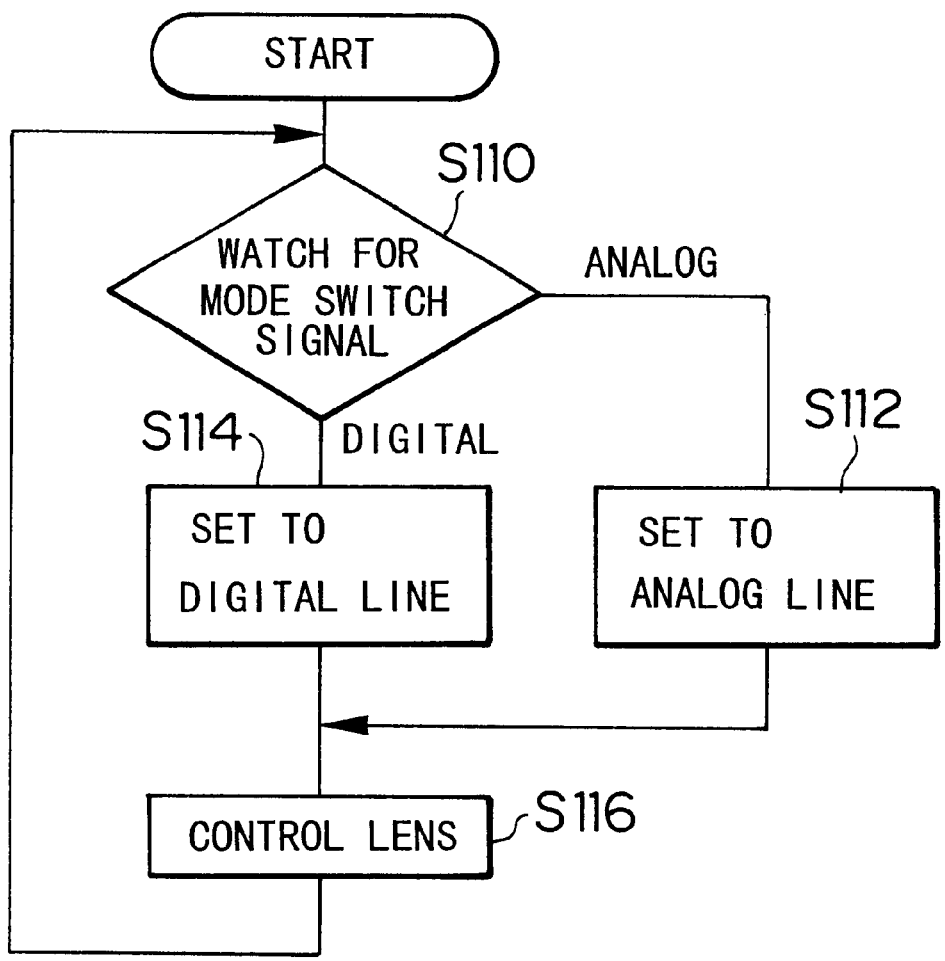
FIG. 2 is a flow chart showing the procedure for selecting an analog mode or a digital mode in the lens control unit in FIG. 1.

This invention will be described in further detail by way of example with reference to the accompanying drawings.

FIG. 1 is a block diagram showing a TV lens control unit constructed in accordance with the first embodiment of the present invention. The lens control unit 10 comprises: a control knob 12; a rotary encoder 14 for determining the operated amount of the control knob 12; a counter 15; a central processing unit (CPU) 16; a communication IC 18; a D/A converter 20; and an A/D converter 22. The lens control unit 10 detachably connects to a lens device 24, directly or via a TV camera body (not shown), through a cable and connectors (not shown). A potentiometer and an A/D converter may be used to determine the operated amount of the control knob 12, instead of the rotary encoder 14 and the counter 15.

The lens control unit 10 controls the zoom, focus, iris macro, etc. of the lens device 24. The lens control unit 10 has a function of outputting an analog control signal and a function of outputting a control signal in serial communication or a digital control signal. The focus controlling is mainly described hereinafter, but the zoom, iris, macro, etc. are controlled in substantially the same manner.

The rotary encoder 14 outputs encode pulses corresponding to the rotational amount of the control knob 12, and the counter 15 of the rotary encoder 14 counts the encode pulses and sends the counted results to the CPU 16. In accordance with the counted results, the CPU 16 determines the operated amount of the control knob 12 and outputs a control signal corresponding to the operated amount to the D/A converter 20 and the communication IC 18.

The CPU 16 switches movable contacts 26A & 28A of switches 26 & 28 in accordance with a mode switch signal sent from the lens device 24 in order to select either an analog mode or a digital mode.

For example, the lens device 24 outputs a high level voltage signal as the mode switch signal to select the digital mode, and outputs a low level voltage signal as the mode switch signal to select the analog mode. When the lens control unit 10 is connected to the lens device 24, the CPU 16 watches for the mode switch signal to determine which mode should be selected.

When the CPU 16 receives the mode switch signal selecting the analog mode from the lens device 24, the CPU 16 connects the movable contacts 26A & 28A of the switches 26 & 28 with a contact 26B of the D/A converter 20 and a contact 28B of the A/D converter 22 to thereby set the analog mode. In the analog mode, the control signal or the lens control signal corresponding to the operated amount of the control knob 12 is transmitted to the lens device 24 in the form of an analog voltage signal. The lens device 24 transmits an answer signal such as a position signal representing the focus position of the lens, etc. to the lens control unit 10 in the form of an analog voltage signal.

On the other hand, when the CPU 16 receives the mode switch signal selecting the digital mode from the lens device 24, the CPU 16 connects the movable contacts 26A & 28A of the switches 26 & 28 with contacts 26C & 28C of the communication IC 18 to thereby set the digital mode. In the digital mode, the control signal or the lens control signal corresponding to the operated amount of the control knob 12 is transmitted to the lens device 24 in the form of a digital signal through a predetermined serial communication function such as RS232C. The lens device 24 transmits the answer signal such as the position signal representing the focus position of the lens, etc. to the lens control unit 10 in the form of a digital signal through the serial communication.

A description will now be given of the operation of the lens control unit constructed in the above-mentioned manner.

FIG. 2 shows the procedure for selecting the analog or digital mode in the lens control unit 10 in FIG. 1. When the lens control unit 10 is directly connected to the lens device 24, or when the lens control unit 10 is connected to the TV camera body (not shown) so that the lens control unit 10 can be electrically connected to the lens device 24, the CPU 16 of the lens control unit 10 watches for the mode switch signal outputted from the lens device 24 (S100). If the CPU 16 receives the mode switch signal selecting the analog mode from the lens device 24, the CPU 16 connects the movable contacts 26A & 28A of the switches 26 & 28 with the contact 26B of the D/A converter 20 and the contact 28B of the A/D converter 22, respectively, so as to set the control signal line and the answer signal line to the analog lines (S112). Thereafter, the lens device 24 is controlled under the control knob 12 with the analog signal (S116).

On the other hand, if the CPU 16 receives the mode switch signal selecting the digital mode from the lens device 24, the CPU 16 connects the movable contacts 26A & 28A of the switch means 26 & 28 with the contacts 26C & 28C of the communication IC 18 so as to set the control signal line and the answer signal line to the digital lines (S114). Thereafter, the lens device 24 is controlled in the serial communication (S116).

After S116, the processing from S110 to S116 is repeated.

In accordance with this embodiment, only one lens control unit 10 can be used to control both the lens device 24 in the analog mode and the lens device in the digital mode.

A description will now be given of the second embodiment of the present invention.

Figure 3:
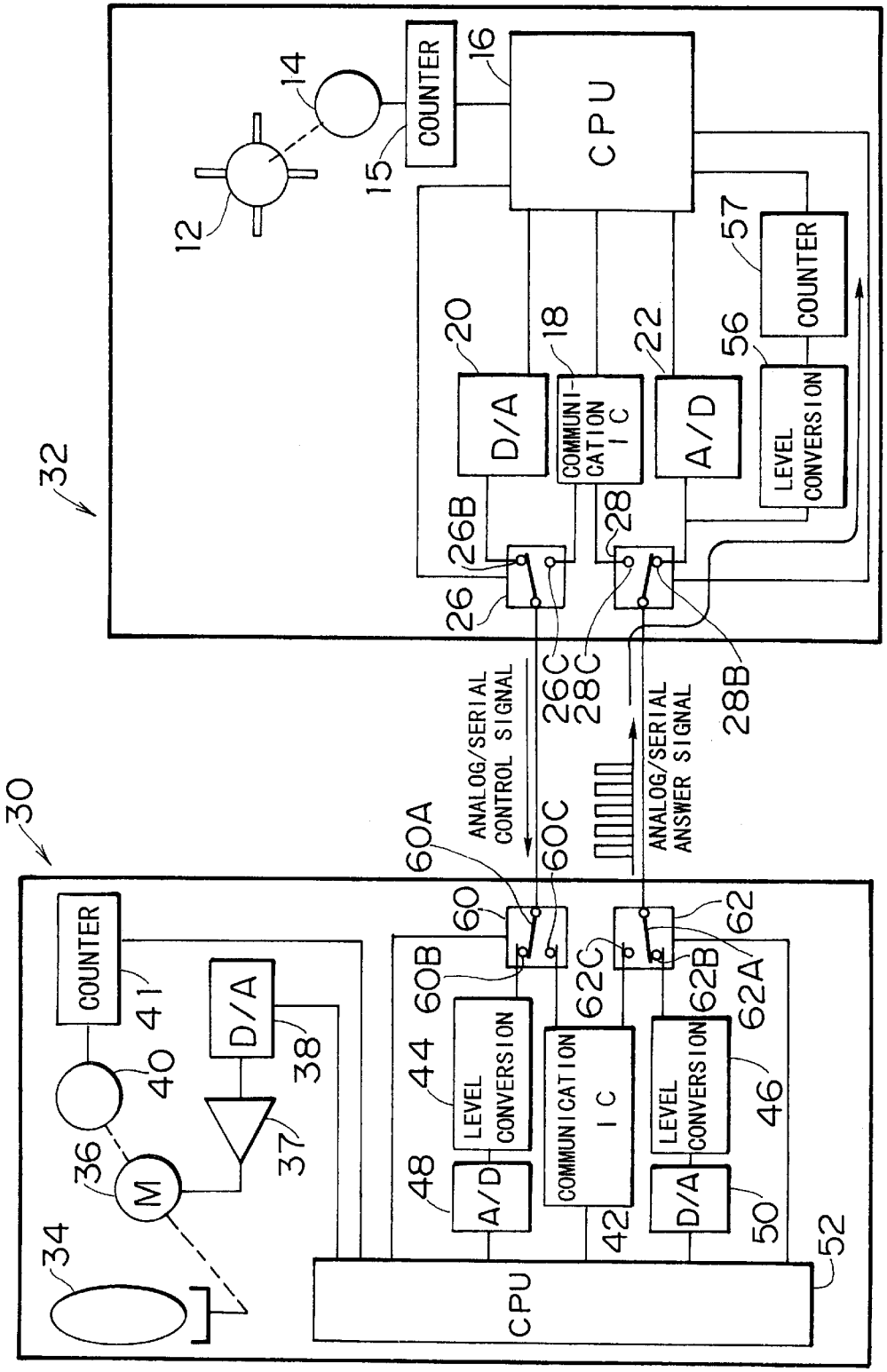
FIG. 3 is a block diagram showing a lens control unit for a TV camera, which is constructed in accordance with the second embodiment of this invention.

FIG. 3 shows a lens control unit 32 constructed in accordance with the second embodiment and a lens device 30 connected to the lens control unit 32. Parts similar to those described with reference to FIG. 1 are denoted by the same reference numerals, and they will not be explained hereinafter.

The lens device 30 in FIG. 3 is a dual mode lens device, which can be controlled with both the analog control signal and the digital control signal. As shown in FIG. 3, the lens control unit 32, which can be used in both the digital mode and the analog mode, connects to the lens device 30.

The lens device 30 comprises: a lens part 34; a lens drive motor 36; an amplifier 37 for driving the motor 36; a D/A converter 38; a rotary encoder 40 for determining the number of rotation of the motor 36; a counter 41; a communication IC 42; level converting circuits 44 & 46; an A/D converter 48, a D/A converter 50; and a CPU 52 for supervising the circuits. The lens part 34 is a zoom lens, which includes a plurality of lenses.

In the lens control unit 32, a level converting circuit 56 connects to the contact 28B of the switch means 28 at the input part so that the level converting circuit 56 can be parallel with the A/D converter 22. A counter 57 is provided at the back of the level converting circuit 56.

The lens device 30 is set in the analog mode when being turned on (in the initial state), and movable contacts 60A & 62A of switches 60 & 62 at the input and output parts connect to contacts 60B & 62B of the level converting circuits 44 & 46, respectively.

The lens control unit 32 is set in the analog mode when being turned on. The movable contacts 26A & 28A of the switches 26 & 28 connect to the contacts 26B & 28B, respectively. In the analog mode, the analog signal of 2.5V–7.5V as the answer signal such as the position signal is transmitted on the answer signal line.

If the lens device 30 has the serial communication function, the lens device 30 transmits a mode switch signal to the lens control unit 32, which is set in the analog mode in the initial state, so that the lens device 30 is switched to the serial communication mode (the digital mode).

More specifically, the CPU 52 of the lens device 30 applies a pulse signal of several hundred hertzes (100 Hz–1 kHz, more preferably, about 300 Hz to about 700 Hz) to the D/A converter 50. The output of the D/A converter 50 is applied to the level converting circuit 46 in order to convert the level of the pulse signal into 2.5V to 7.5V. Consequently, a square wave pulse signal of several hundred hertzes with the oscillation of 2.5V–7.5V is generated as the mode switch signal selecting the digital mode. The pulse signal is superimposed on the answer signal line, and the superimposed signal is transmitted to the lens control unit 32.

In the lens control unit 32, the pulse signal (the mode switch signal) is applied to the level converting circuit 56 through the switch 28 at the input part. The level converting circuit 56 converts the level of the pulse signal and applies the converted signal to the counter 57, which counts the pulses included in the pulse signal. The CPU 16 of the lens control unit 32 periodically monitors the counter 57. When the counted value of the counter 57 reaches a predetermined value, the CPU 16 judges that the lens device 30 has instructed the lens control unit 32 to switch to the digital mode.

Upon detection of the mode switch signal indicating the change to the digital mode, the CPU 16 connects the movable contacts 26A & 28A of the switches 26 & 28 to the contacts 26C & 28C of the communication IC 18, respectively. Consequently, the lens control unit 32 is set in the digital mode. Thereafter, in the lens device 30, the CPU 52 connects the movable contacts 60A & 62A of the switches 60 & 62 to the contacts 60C & 62C of the communication IC 42 so as to select the digital mode.

When the control knob 12 is rotated, the rotary encoder 14 determines the rotated amount of the control knob 12 and the counter 15 counts the encode pulses outputted from the rotary encoder 14. The CPU 16 reads the counted value of the counter 15, and outputs the control signal corresponding to the rotated amount of the control knob 12 to the D/A converter 20 and the communication IC 18.

In the digital mode, the control signal outputted from the communication IC 18 is transmitted to the lens device 30 through the control signal line and is applied to the communication IC 42. Then, the control signal is applied to the CPU 52 through the communication IC 42. In the analog mode, the analog control signal that is generated by converting the control signal into the analog voltage signal by the D/A converter 20 is transmitted to the lens device 30 through the control signal line and is applied to the level converting circuit 44. Then, the level converting circuit 44 converts the level of the analog control signal, and applies the signal to the A/D converter 48. The A/D converter 48 converts the analog control signal into a digital signal, which is applied to the CPU 52.

The CPU 52 outputs a motor control signal corresponding to the control signal, which is transmitted from the lens control unit 32, to the D/A converter 38. The D/A converter 38 converts the motor control signal into an analog signal, which is amplified by the amplifier 37 and applied to the motor 36 as a drive signal. The motor 36 operates in accordance with the drive signal applied from the amplifier 37, and the rotational force of the motor 36 is transmitted to the lens part 34 through a transmission mechanism (not shown) to thereby move the lens part 34.

The rotary encoder 40 determines the rotational amount of the motor 36, and the counter 41 counts the encode pulses outputted from the rotary encoder 40. The CPU 52 reads the counted value of the counter 41 and finds the movement amount and position of the lens part 34 in accordance with the counted value of the counter 41. The CPU 52 outputs the position signal representing the position of the lens part 34 to the D/A converter 50 and the communication IC 42. In the analog mode, the D/A converter 50 converts the position signal into an analog signal, the level converting circuit 46 converts the level of the analog position signal, and then, the analog position signal is transmitted to the lens control unit 32. In the digital mode, the position signal is transmitted from the CPU 52 to the lens control unit 32 through the communication IC 42 in the digital form.

FIG. 4 shows the procedure for selecting the mode in the lens control unit 32 constructed in the above-mentioned manner.

When being turned on, the lens control unit 32 enters an initialization mode (S120), and the analog mode is set (S122). If the lens device 30 has both the analog mode and the digital mode, it is set in the analog mode in the initial state to enable the signal processing in the analog mode (S124).

Next, the CPU 16 determines whether it is time to check the counter 57 of the lens control unit 32 (S126). If it is not time to check the counter 57, the procedure returns to S124, and if it is time to check the counter 57, the CPU 16 reads the counted value of the counter 57 in order to determine whether the counted value reaches the predetermined value.

If the lens device 30 outputs the mode switch signal or the pulse signal of several hundred hertzes through the answer signal line during the analog processing (S124), the counted value of the counter 57 in the lens control unit 32 is increased. On the other hand, if the lens device 30 does not have the digital communication function, the above-mentioned mode switch signal selecting the digital mode is not outputted, or a switch signal with a different frequency from the mode switch signal selecting the digital mode is outputted. It is therefore possible to determine whether lens device 30 has instructed the lens control unit 32 to switch to the digital mode.

If the counter 57 has not reached the predetermined value at S128, the analog mode is maintained (S130) and the procedure returns to S124. In this case, the lens device 30 is controlled in the analog mode.

On the other hand, if the counter 57 has reached the predetermined value at S128, the CPU 16 determines that the instruction has been given to switch the mode to the digital mode and then switches the mode from the analog mode to the digital mode (S132). The lens device 30 is also switched to the digital mode so that the lens device 30 can be controlled in the serial communication (S134).

As stated above, the signal with the unexpected frequency and oscillation for the answer signal is superimposed on the analog answer signal and is transmitted from the lens device 30 to the lens control unit 32 as the mode switch signal. It is therefore possible to transmit the mode switch signal from the lens control unit 32 using the existing analog signal line even if it is impossible to provide a special signal line between the lens control unit 32 and the lens device 30.

In these embodiments, the lens control unit, which is able to output the control signal in the analog mode and the control signal in the digital mode, receives the mode switch signal from the lens device to select either one of the analog and digital modes, and outputs the control signal in the selected mode. The lens control unit, however, may also output the control signals in both the analog and digital modes at the same time. For example, the first signal line for transmitting the analog control signal and the second signal line for transmitting the digital control signal may be provided separately.

As set forth hereinabove, the lens control unit according to this invention is able to output the control signals in both the analog and digital modes, or detect the mode switch signal from the lens device to select either one of the analog and digital modes and output the control signal in the selected mode. For this reason, in the camera system that has the lens control unit and the lens device according to this invention, one lens control unit can control both the lens devices in the digital mode and the analog mode, and thus, the components can easily be replaced in emergency.

In particular, the mode switch signal with the unexpected frequency for the analog signal is superimposed on the analog answer signal for the transmission, and this eliminates the necessity of providing a special line for the mode switch signal and enables the transmission of the mode switch signal even if it is impossible to provide an extra line.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A lens control unit electrically connecting to a lens device of a TV camera to control at least one of zoom, focus, iris and macro of the lens device, the lens control unit comprising:
   a first control signal generator for generating an analog control signal; and
   a second control signal generator for generating a digital control signal,
   wherein the lens control unit is detachably connected to the lens device and outputs both the analog control signal and the digital control signal to the lens device in accordance with an operated amount of a common control member, and
   wherein the analog control signal generated by the first control signal generator and the digital control signal generated by the second control signal are directly transmitted to the lens device, simultaneously or separately.

2. The lens control unit as defined in claim 1, further comprising:
   a rotary encoder for determining the operated amount of the control member; and
   a counter for counting pulses outputted from the rotary encoder.

3. A lens control unit electrically connecting to a lens device of a TV camera to control at least one of zoom, focus, iris and macro of the lens device, the lens control unit comprising:
   a first control signal generator for generating an analog control signal;
   a second control signal generator for generating a digital control signal;
   a detector for detecting a mode switch signal outputted from the lens device; and
   a mode selector for selecting a mode of the lens control unit from an analog mode and a digital mode in accordance with the mode switch signal detected by the detector,
   wherein the lens control unit is detachably connected to the lens device and outputs one of the analog control signal and the digital control signal in the mode selected by the mode selector to the lens device, and
   wherein the analog control signal generated by the first control signal generator and the digital control signal generated by the second control signal are directly transmitted to the lens device, simultaneously or separately.

4. The lens control unit as defined in claim 3, further comprising:
   an answer signal line for transmitting an answer signal outputted from the lens device, the answer signal representing at least one of states of the zoom, the focus, the iris and the macro of the lens device,
   wherein the answer signal line trasmits an analog signal and the mode switch signal has a frequency different from the answer signal, and the detector detects the mode switch signal through the answer signal line without a special line for the mode switch signal.

5. The lens control unit as defined in claim 3, further comprising:
   a control member manually operated to control the lens device;
   a rotary encoder for determining an operated amount of the control member; and
   a counter for counting pulses outputted from the rotary encoder.

6. A lens device controlled by the lens control unit as defined in claim 3, comprising:
   a mode switch signal generator for generating the mode switch signal selecting the mode of the lens control unit,
   wherein the lens device outputs an answer signal representing at least one of states of the zoom, the focus, the iris and the macro of the lens device, and the mode switch signal has a frequency different from the answer signal.

7. A lens control unit for controlling a lens device, comprising:
   a control member configured to be manually operable for controlling the lens device;
   a control signal generator configured for generating both an analog control signal and a digital control signal corresponding an operated amount of the control member;
   a mode selector configured for selecting a mode, wherein the mode is one of an analog mode or a digital mode; and
   a switch configured for transmitting one of the analog control signal or the digital control signal from the control signal generator to the lens device corresponding to the mode,
   wherein the lens control unit is configured to be detachably attached to the lens device.

8. The lens control unit of claim 7, wherein the mode selector selects the mode based on a mode switch signal from the lens device.

9. The lens control unit of claim 8, further comprising an answer signal receiver configured for receiving an analog answer signal or a digital answer signal from the lens device.

10. The lens control unit of claim 9, wherein a connection between the mode selector and the lens device is separate from a connection between the answer signal receiver and the lens device.

11. The lens control unit of claim 10, wherein the mode selector is configured to select the mode based on a voltage level of the mode switch signal.

12. The lens control unit of claim 10, wherein the connection between the answer signal receiver and the lens device is a serial communication line.

13. The lens control unit of claim 9, wherein the mode selector and the answer signal receiver are configured to utilize a common connection to the lens device.

14. The lens control unit of claim 13, wherein the mode selector is configured to select the mode based on pulses on the mode switch signal.

15. The lens control unit of claim 14, wherein the mode selector comprises a counter configured to count a number of pulses on the mode switch signal, wherein the mode selector is configured to switch to the digital mode when the number of pulses on the mode switch signal reaches a predetermined count.

16. The lens control unit of claim 15, wherein the mode selector and the answer signal receiver are configured to simultaneously receive the mode switch signal pulses and the analog answer signal through the common connection to the lens device.

17. The lens control unit of claim 16, wherein the mode selector further comprises a level converter configured for converting a level of the the mode switch signal pulses to a predetermined voltage range pulses.

18. The lens control unit of claim 13, wherein the common connection to the lens device is a serial communication line.

19. The lens control unit of claim 7, wherein the lens control unit is configured to control at least one of zoom, focus, iris, or macro of the lens device.

20. A dual mode lens device, comprising:
   a mode switch signal generator configured for generating a mode switch signal indicating a mode of operation of the dual mode lens device, wherein the mode is one of an analog mode or a digital mode;
   a control signal receiver configured for receiving both an analog control signal and a digital control signal from the lens control device corresponding to the mode; and
   an answer signal generator configured for generating both an analog answer signal and digital answer signal corresponding to the mode in response to the analog control signal or the digital control signal from the lens control unit,
   wherein the lens control unit is configured to be detachably attached to the lens device.

21. The dual mode lens device of claim 20, wherein the mode switch signal generator is configured to generate a series of pulses as the mode switch signal when switching from the analog mode to the digital mode.

22. The dual mode lens device of claim 21, wherein the mode switch signal generator and the answer signal generator are configured to utilize a common connection to the lens control unit.

23. The dual mode lens device of claim 22, wherein the common connection to the lens control unit is a serial communication line.

* * * * *